United States Patent [19]

Suzuki et al.

[11] 4,268,068
[45] May 19, 1981

[54] PASSIVE SEATBELT SYSTEM

[75] Inventors: Ichiro Suzuki, Nagoya; Hisashi Ogawa; Masanao Motonami, both of Toyota, all of Japan

[73] Assignee: Toyota Jidosha Kogyo Kabushiki Kaisha, Toyota, Japan

[21] Appl. No.: 37,151

[22] Filed: May 8, 1979

[30] Foreign Application Priority Data

Aug. 16, 1978 [JP]  Japan ............................ 53-112186[U]
Jan. 24, 1979 [JP]  Japan ............................ 54-8082[U]

[51] Int. Cl.³ ........................................... B60R 21/10
[52] U.S. Cl. ...................................... 280/804; 226/82
[58] Field of Search ..................... 280/804, 803, 802; 180/270, 268; 297/482, 483, 484, 469; 74/30, 29; 16/93 R, 93 D, 95 R, 95 D; 226/76, 77, 78, 79, 80, 82

[56] References Cited

U.S. PATENT DOCUMENTS

| | | | |
|---|---|---|---|
| 3,690,529 | 9/1972 | Prest | 226/76 |
| 3,842,929 | 10/1974 | Wada et al. | 280/804 |
| 3,941,289 | 3/1976 | Jenkins | 226/76 |
| 4,004,829 | 1/1977 | Kato | 280/802 |

FOREIGN PATENT DOCUMENTS 2156926  5/1973  Fed. Rep. of Germany ...... 280/804
65876    5/1950  Netherlands ........................ 226/82

*Primary Examiner*—John A. Pekar
*Attorney, Agent, or Firm*—Koda and Androlia

[57] ABSTRACT

A seatbelt system of the type including a seatbelt, a flexible tape having a plurality of holes along its length and which is coupled to the seatbelt to cause the seatbelt to automatically fasten and unfasten from a passenger and a moving means for causing movement of the flexible tape. The moving means includes a sprocket housing having a substantially circular recess formed therein, a sprocket wheel provided in a portion of the flexible tape, a pair of tape passage shaped channel which is formed in the housing and accommodates the portion of the flexible tape, a pair of tape passage channels which are formed in the sprocket housing tangential to the arc-shaped channel and which are oriented in opposite directions and a driving means for selectively rotating the sprocket a predetermined number of rotation in a clockwise and counterclockwise direction.

13 Claims, 32 Drawing Figures

FIG. 1

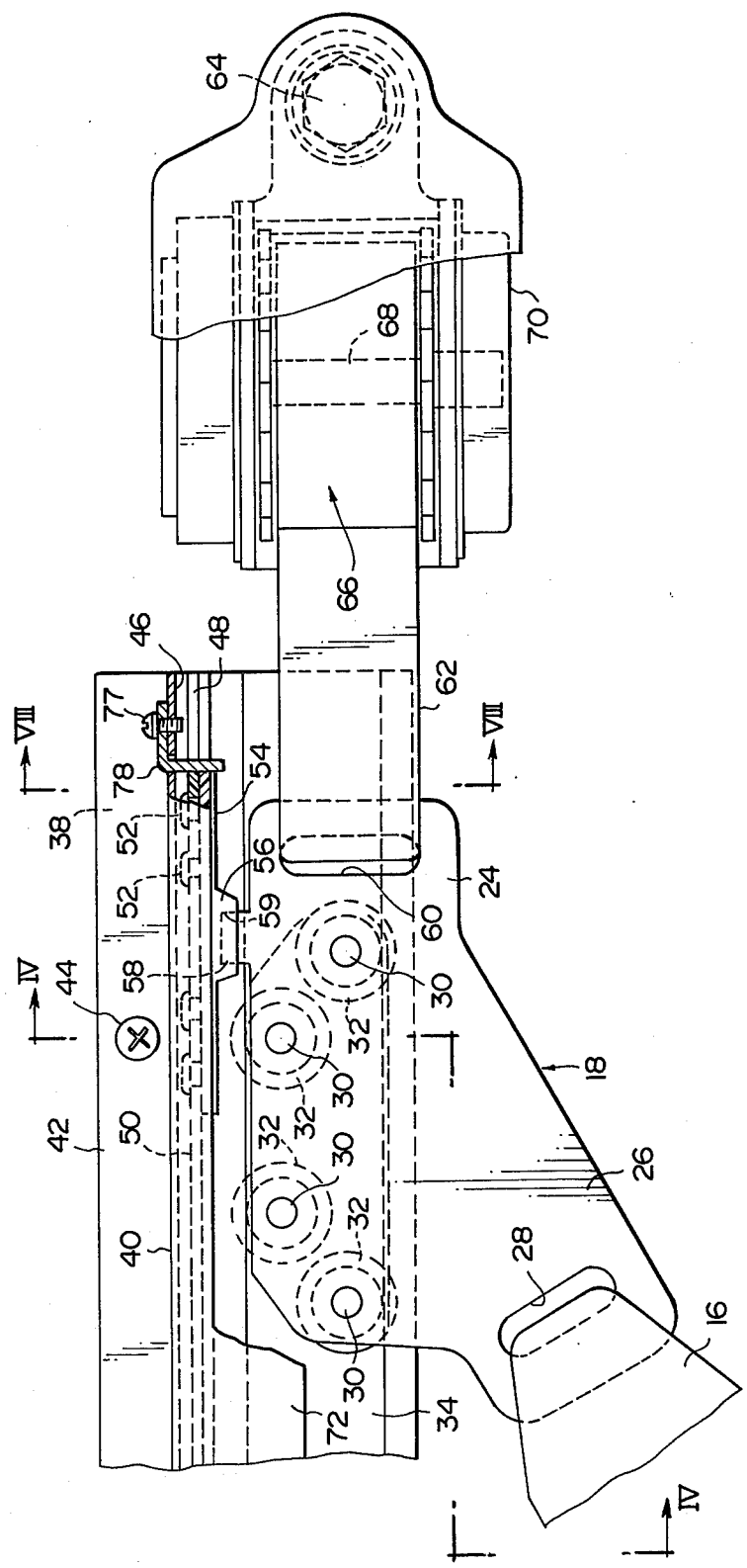

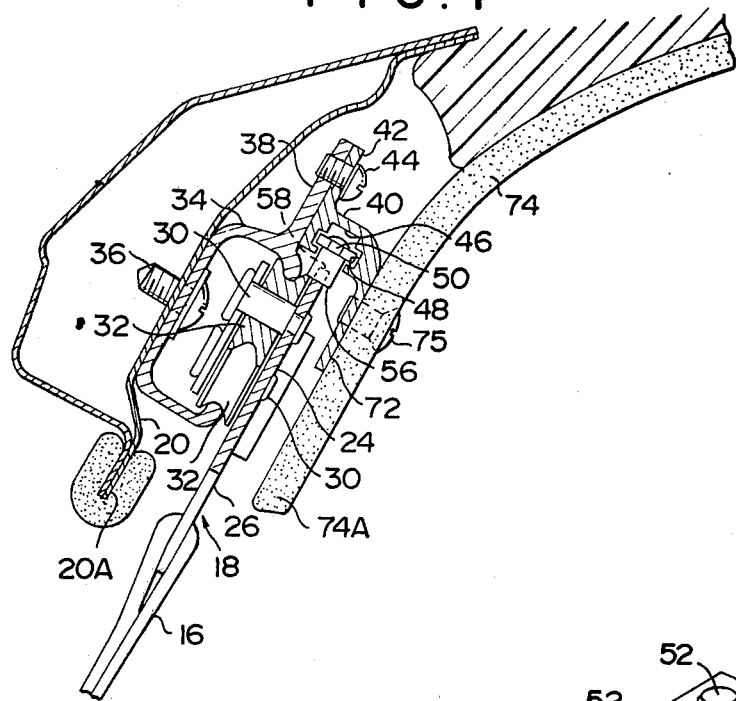
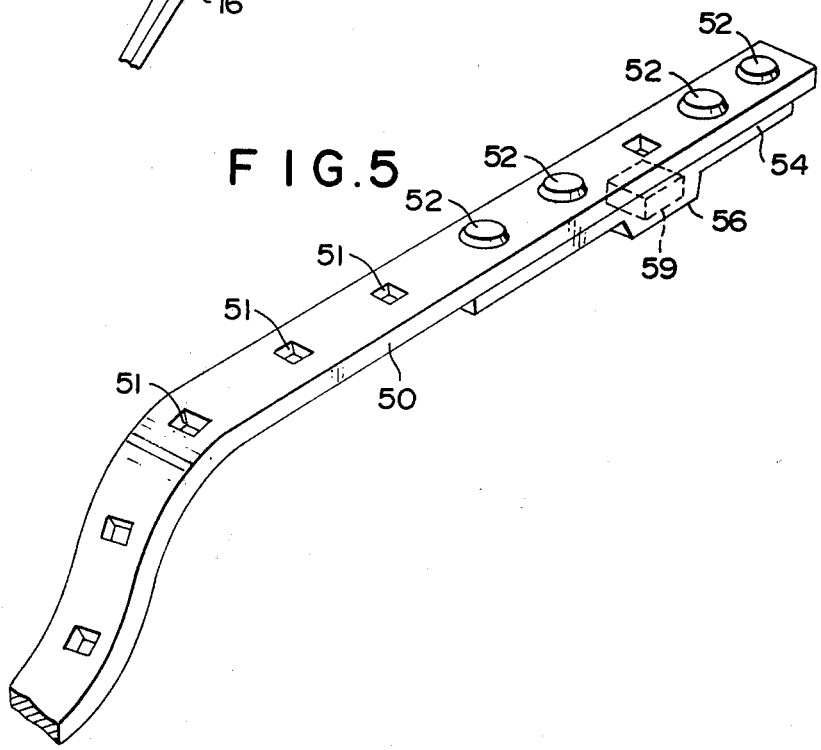

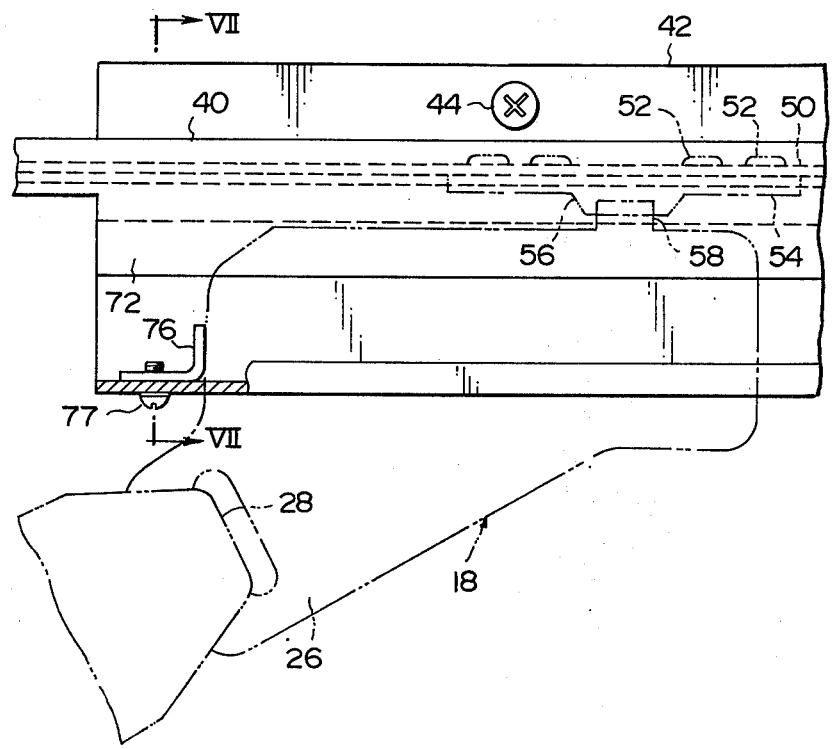
FIG.6
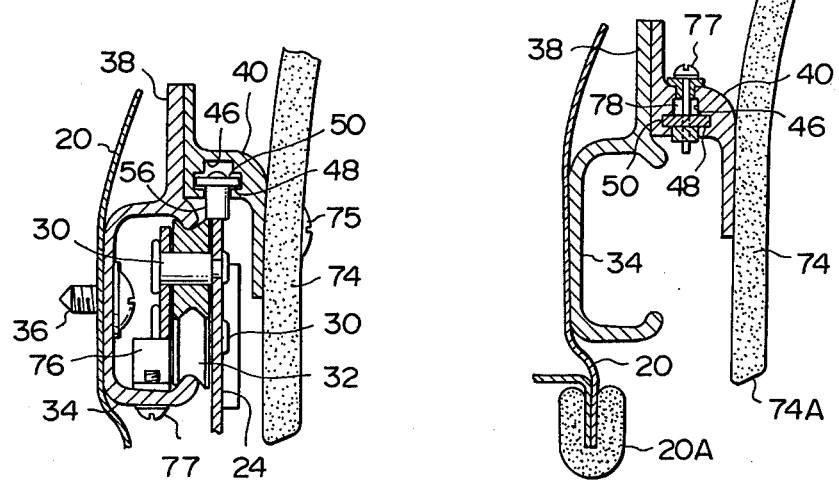
FIG.7
FIG.8

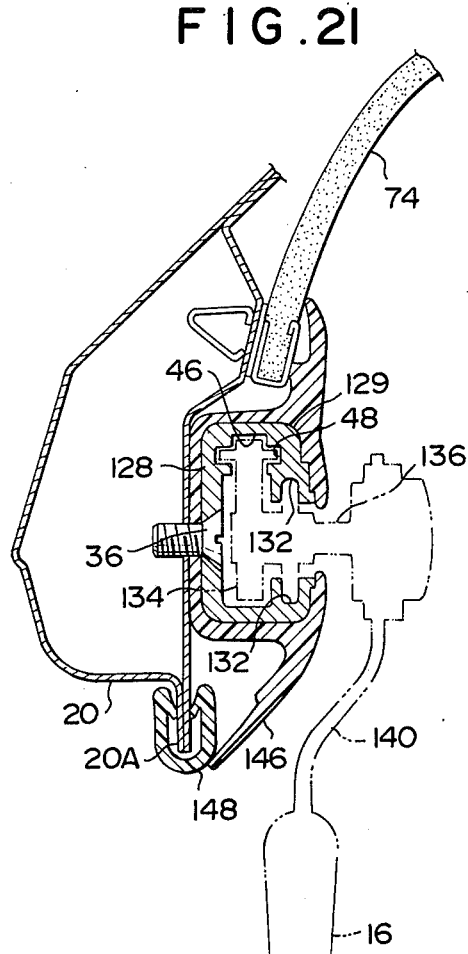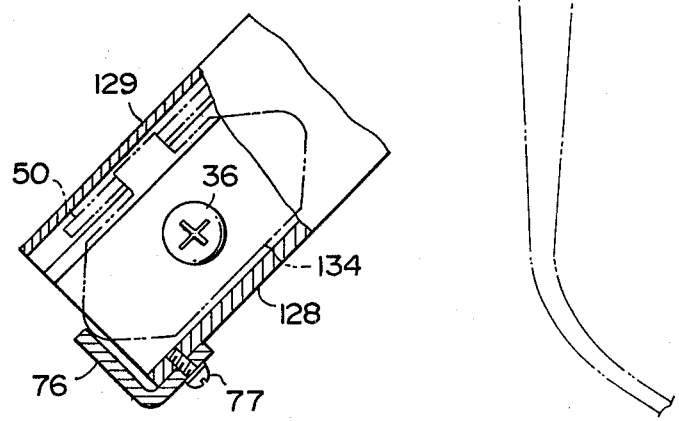

PASSIVE SEATBELT SYSTEM

BACKGROUND OF THE INVENTION

1. Field of the Invention

This invention relates to passive seatbelt systems and more particularly to passive seatbelt systems which automatically move the seatbelt to fasten and unfasten the seatbelt.

2. Prior Art

Since seatbelt systems restrain and protect passengers during vehicular emergencies, they contribute to the safety of the motor vehicle. In spite of this fact, however, the percentage of passengers who wear seatbelts is extremely low because of the difficulty in donning the seatbelt, a feeling of pressure when seatbelt is worn, etc.

As a result, passive seatbelt systems have been proposed which make it possible to automatically fasten the belt around the passenger after the passenger has seated himself in the vehicle. Such passive seatbelts are designed such that the driving force of a motor is used to move one end or an intermediate portion of the belt back and forth in the direction of the length of the vehicle. This causes the belt to alternately approach and move away from the passenger seat so that the space between the belt and the passenger alternately contracts and expands. In this way, the belt is automatically fastened around and removed from the passenger.

In such a passive seatbelt system, a wire is used as the tractive part in order to transmit the driving force of the motor to the belt. These systems using a wire require captans and pulleys and are very complex and expensive. In addition, the installation of these parts in the vehicle is difficult and extremely inefficient.

SUMMARY OF THE INVENTION

Accordingly, it is a general object of the present invention to provide a passive seatbelt system which utilizes a tape and sprocket wheel and which can be efficiently and easily assembled and installed.

The above mentioned objects of the present invention are accomplished by a unique passive seatbelt system of the type including a seatbelt, a flexible tape having a plurality of holes along its length and which is coupled to the seatbelt to cause the seatbelt to automatically fasten and unfasten from passenger and a moving means for causing movement of the flexible tape. The moving means includes a sprocket housing having a substantially circular recess formed therein, a sprocket wheel provided in the housing and engaging with the holes in the tape, an arc-shaped channel which is formed in the housing and accomodates the portion of the flexible tape, a pair of tape passage channels which are formed in the sprocket housing tangential to the arc-shaped channel and which are oriented in opposite directions and a driving means for selectively rotating the sprocket at a predetermined number of rotation in a clockwise and counterclockwise direction.

BRIEF DESCRIPTION OF THE DRAWINGS

The above mentioned features and objects of the present invention will become more apparent with reference to the following description taken in conjunction with the accompanying drawings wherein like reference numerals denote like elements and which:

FIG. 1 is a side view illustrating a first embodiment of a passive seatbelt system in accordance with the teachings of the present invention;

FIG. 3 is a partial expanded view of FIG. 1;

FIG. 4 is a cross section view along the line IV—IV in FIG. 3;

FIG. 5 is a partial oblique view which illustrates the thick tape;

FIG. 6 is a partial view of FIG. 1 illustrating a forward stopper;

FIG. 7 is a cross section view along the line VII—VII in FIG. 6;

FIG. 8 is a cross section view along the line VIII—VIII in FIG. 3;

FIG. 21 is a cross section view along the line XXI—XXI in FIG. 18;

FIG. 22 is a partial cross section view illustrating the forward end of the guide rail in FIG. 18;

DETAILED DESCRIPTION OF THE INVENTION

Figure 1:
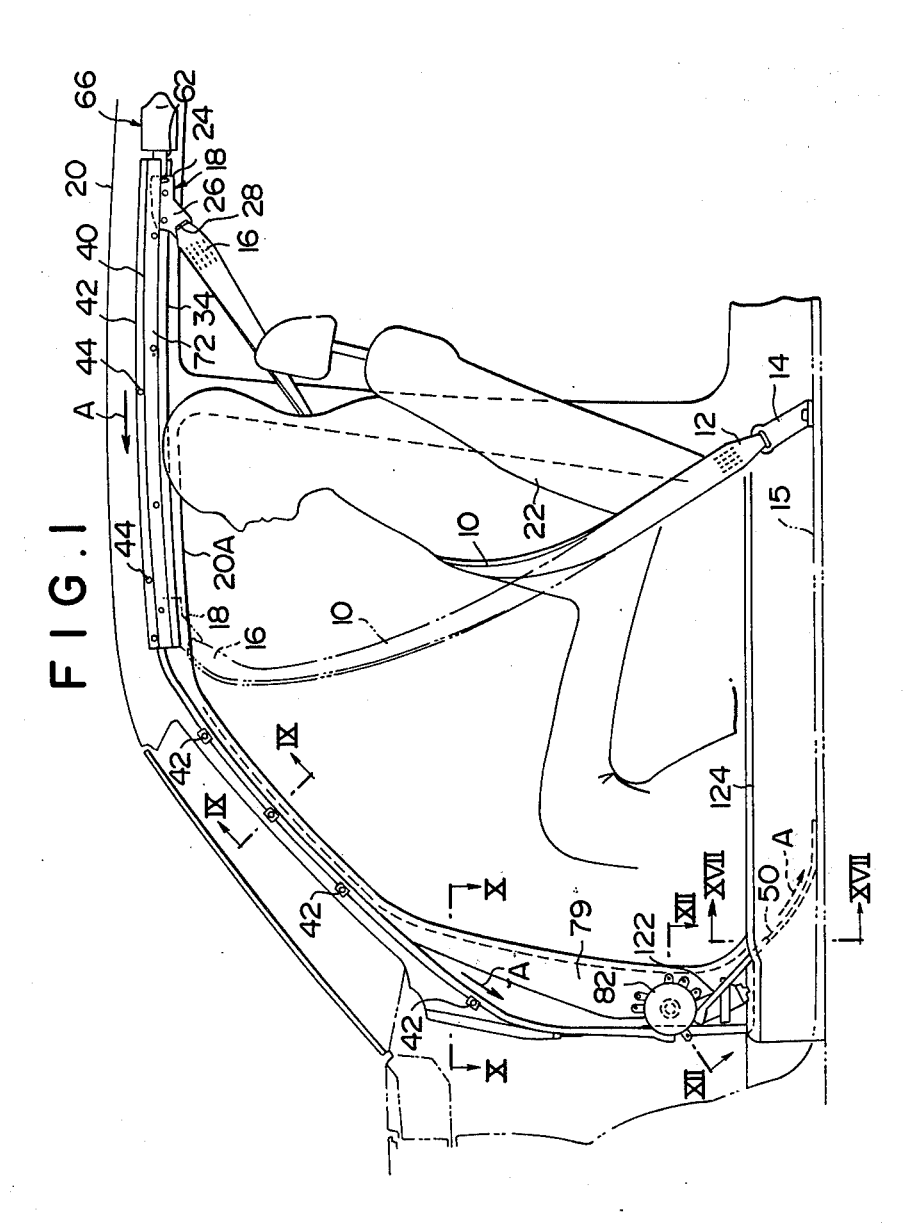
Figure 2:
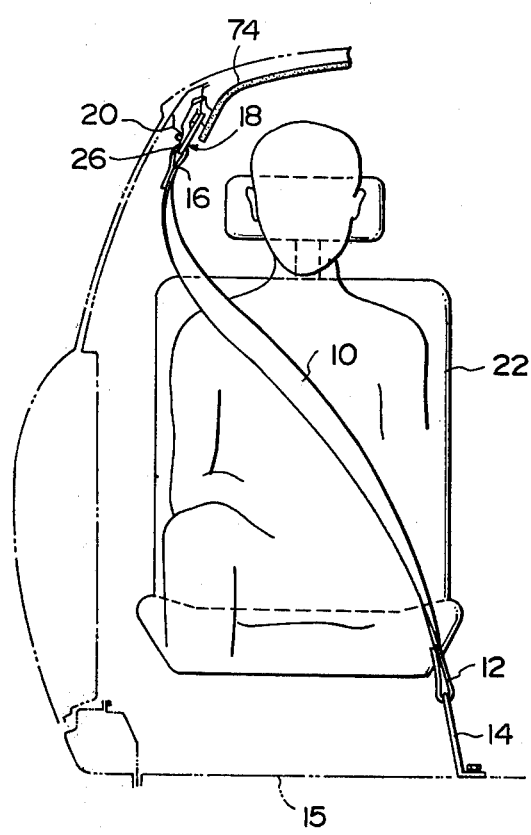
FIG. 2 is a side view of the embodiment of FIG. 1 seen from the front of the vehicle.

Referring to FIG. 1 and shown therein, is a first embodiment of passive seatbelt system in accordance with the teachings of the present invention. In the Figures, first embodiment includes a passenger restraining belt 10 anchored at its inner end 12 to the vehicle floor 15 by an inner anchor 14. The inner anchor 14 is installed at the approximate center of the vehicle with respect to the transverse axis of the vehicle.

The outer end 16 of the belt 10 is fastened to a truck 18 so that it can be caused to move in the direction of the length of the vehicle along a roof side member 20 of the vehicle. This movement causes the belt 10 to approach or move away from a passenger seat 22 so that the belt 10 can be automatically fastened around or removed from the passenger seated in the seat 22.

As is shown in FIGS. 3 and 4, the truck 18 is provided with a movable plate 24. A slot 28 is formed in an extended portion 26 of the movable plate 24 which projects toward the floor of the vehicle. The outer end 16 of the belt 10 is anchored to the slot 28. Furthermore, four shafts 30 are provided parallel to each other on the moving plate 24 and drum-shaped wheels 32 whose wheel diameter is reduced in the middle as shown in FIG. 4 are mounted on each of the shafts 30. As is shown in FIG. 4, the wheels 32 are held in a guide rail 34 which is roughly U-shaped in cross section such that the wheels can roll along the length of the guide rail 34, i.e. in a direction of the length of the vehicle. Furthermore, a flange 38 is provided on the top of the guide rail 34 and is fastened by means of fastening screws 44 to a flange 42 which extends to the top of the guide rail 40. Accordingly, the slide rail 40 is positioned parallel to the guide rail 34. A continuous rectangular groove 46 is formed in the central portion of the slide rail 40 and extends along the length of the side rail 40. Two slide grooves 48 which effectively increase the width of the rectangular groove 46, are formed at an intermediate depth in the rectangular groove 46. The thick tape shown in FIG. 5 is provided within the slide grooves 48 so that thick tape 50 slides along the length of the slide rail 40.

As is shown in FIG. 5, the cross sectional shape of the thick tape 50 is rectangular. A plurality of openings 51 is formed at equal intervals along the length of the tape 50. Furthermore, the dimensions of the rectangular cross section of the thick tape 50 are such that only a slight space is left between the tape 50 and the walls of the slide grooves 48 of the slide rail 40 when the tape 50 is inserted in the slide grooves 48. Accordingly, the thick tape 50 is able to transmit not only a tensile force but also a compressive force. Furthermore, it is desirable that a synthetic resin be used for the material of the tape 50. An appropriate degree of softness will make it possible for the tape 50 to bend slightly.

A sliding block 54 is fastened to one end of the thick tape 50 by means of four rivets 52. The recess 59 which accomodates a projection 58 that projects from the movable plate 24 toward the sliding block 54 is formed in a projection 56 which projects from the sliding block 54 towards the movable plate 24. Inserting the projection 58 into the recess 59 makes it possible to cause the truck 18 to move simultaneously in the direction of the length of the vehicle whenever the sliding block 54 moves together with the thick tape 50. A slot 60 is formed in the rear end (i.e. the end toward the rear of the vehicle) of the movable plate 24. One end of the narrow belt 62 is anchored to the slot 60. The other end of the narrow belt 62 is retracted on a retractor shaft 68 of a retractor mechanism 66 which is fastened by means by fastening bolt 64 to a roof side member 20 to the rear of the guide rail 34.

The retractor mechanism 66 is a well known emergency locking retractor which abruptly stops extenstion of the belt 62 only during a vehicular emergency. Under ordinary conditions, the belt 62 is retracted by the force of the spring 70. Accordingly, movable plate 24, which is connected to the retractor mechanism 66 by the belt 62, is caused to move toward the rear of the vehicle by the force of the spring 70. During a vehicular emergency, the extension of the belt 62 is halted by the retractor mechanism 66 such that the outer end 16 of the passenger restraining belt 10 is securely anchored to the roof side member 20.

As shown in FIG. 4, a flange 72 provided on the slide rail 40 on the side opposite from the flange 42, i.e. toward the floor of the vehicle. The roof lining 74 which lines the roof over the vehicle interior is fastened to the flange 72 by means of fastening screws 75. Accordingly, the guide rail 34, slide rail 40 and truck 18, etc., are clamped between the roof lining 74 and the roof side member 20. As a result, the guide rail 34, slide rail 40 and truck 18 do not project into the interior of the vehicle. Only a narrow opening connecting with the vehicular interior is left between the lower end 74A of the roof lining 74 and the lower end of the roof side member 20 so that the movable plate 24 can move along this opening. Accordingly, the truck 18 and thick tape 50 which move along the guide rail 34 and slide rail 40 cannot be seen from the interior of the vehicle. This results in a clean and safe design.

Figure 9:
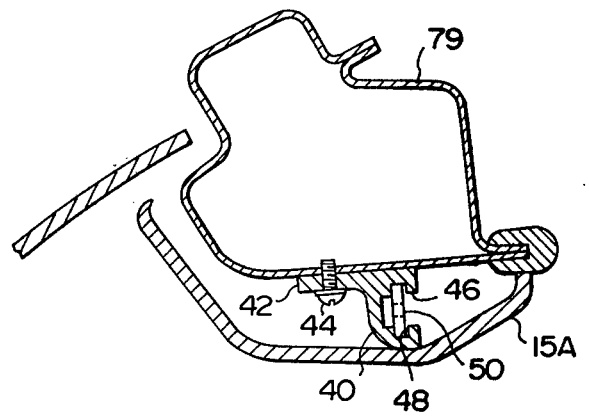
FIG. 9 is a cross section view along the line IX—IX of FIG. 1.
Figure 10:
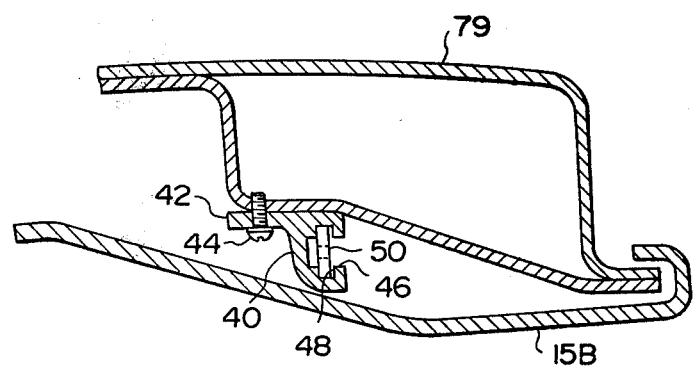
FIG. 10 is a cross section view along the line X—X in FIG. 1.
Figure 11:
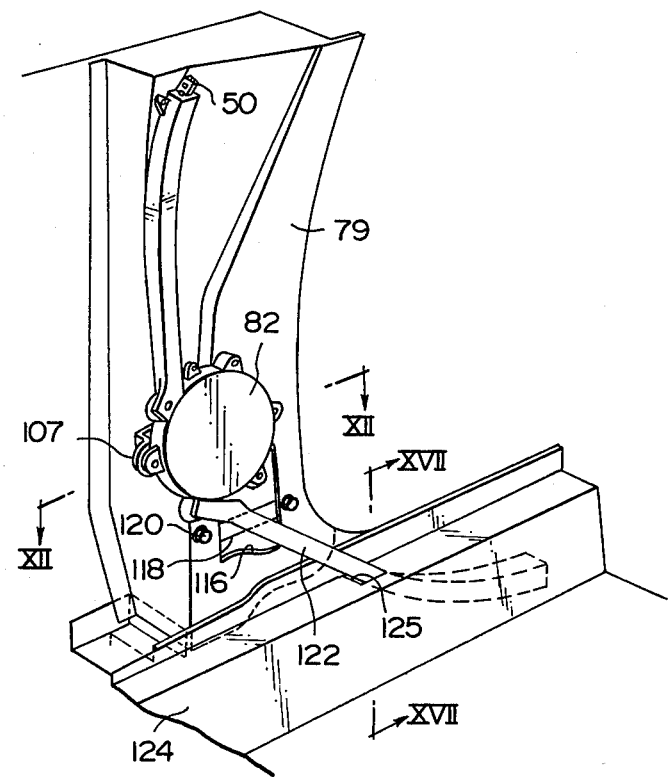
FIG. 11 is a partial oblique view as seen from the vehicle interior which illustrates the installation of the passive seatbelt system in accordance with the teachings of the present invention in the area extending from the pillar to the rocker panel.

Furthermore, as shown in FIGS. 6 and 7, L-shaped forward stopper 76 is fastened to the forward end of the guide rail 34 by means of fastening screws 77 and a portion of the stopper 76 regulates the maximum amount of movement of the movable plate 24 toward the front of the vehicle, as indicated by the two-dot chain line in FIG. 6. Furthermore, as shown in FIGS. 3 and 8, an L-shaped rear stopper 78 is fastened by means of a fastening screw 77 to the slide rail 40 near the rear end of the guide rail 74. A portion of this stopper 78 projects into the interior of rectangular groove 46 in the slide rail 40. Accordingly, as shown in FIG. 3, the L-shaped rear stopper 78 regulates the amount of movement toward the rear of the vehicle of the thick tape 50 through the slide grooves 48. As shown in FIGS. 9 and 10, the slide rail 40 is fastened to the vehicle interior side of the front pillar 70 of the vehicle by means of fastening screws 44 and the slide rail 40 drops along the front pillar 79. As is shown in FIG. 11, the lower end of the slide rail 40 is fastened to a sprocket housing 82.

As is shown in FIGS. 12 through 16, the sprocket housing 82 takes the form of a thick circular plate. A substantially circular housing recess 86 for the sprocket wheel 84 is formed in the body of the sprocket housing 82. When the cover 88 is fastened to the sprocket housing 82, the housing recess 86 is closed off. An arc-shaped channel 90 is formed near the circumference of the housing 86 and sprocket housing 82 and the cover 88. This arc-shaped channel 90 consisting of two matching grooves which are positioned so as to form a channel is smaller in diameter than the outer edge of the housing recess 86. However, this arc-shaped channel 90 cuts deeper into the sprocket housing 82 and the cover 88 than the housing recess 86. The arc-shaped channel 90 accommodates the portion of the thick tape 50 that is engaged with the sprocket wheel 84. In this case, the arc-shaped channel is annular, however, the arc-shaped channel in this invention is not necessarily have to be a continuous annular channel. Furthermore, a pair of tape passage channels 92 and 94 which extend tangentially with respect to the arc-shaped channel 90 are cut to the same depth in the sprocket housing 82 and the cover 88 as the arc-shaped channel 90. These channels 92 and 94 face in different directions and allow the portion of the thick tape 50 that engages with the sprocket wheel 82 to enter and exit. Accordingly, the thick tape 50 enters the arc-shaped channel 90 via the tape passage channel 92 and engages with the sprocket wheel 84 and then exits the sprocket housing 82 via the tape passage channel 94.

Figure 12:
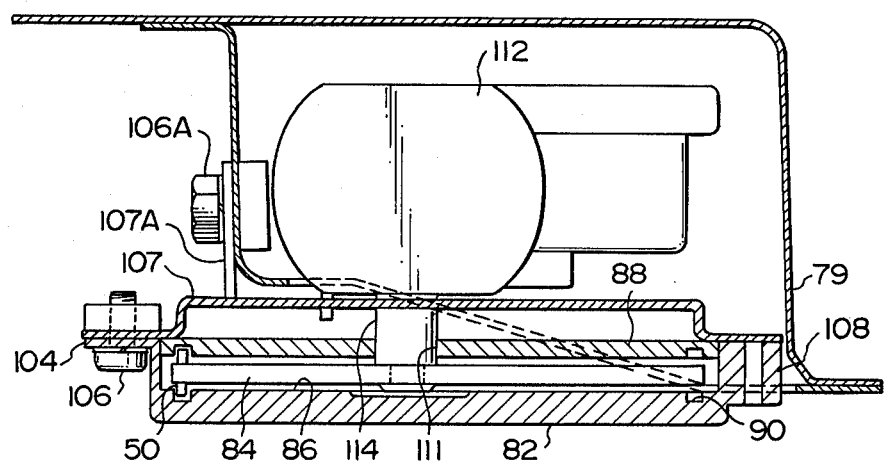
FIG. 12 is a cross section view along the line XII—XII in FIG. 11.
Figure 13:
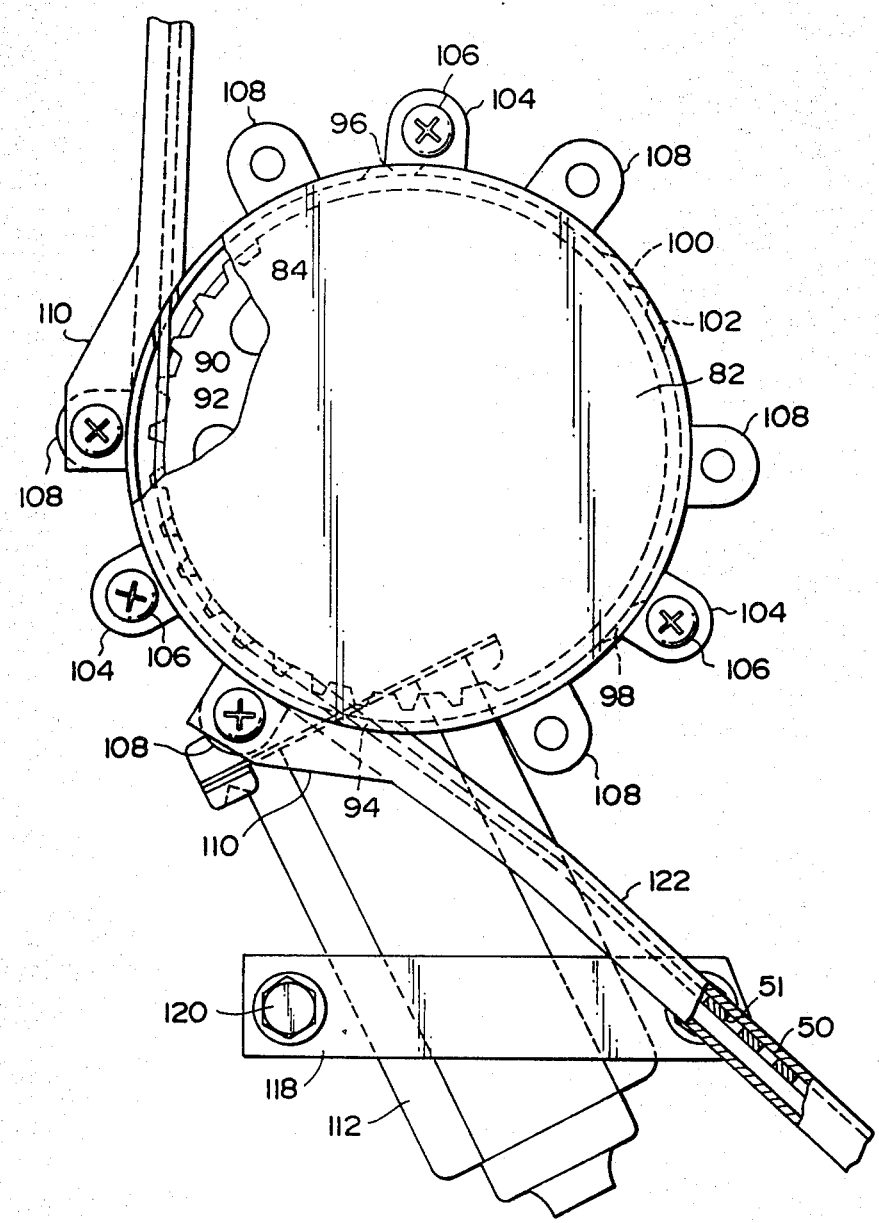
FIG. 13 is a front view illustrating a sprocket housing.
Figure 14:
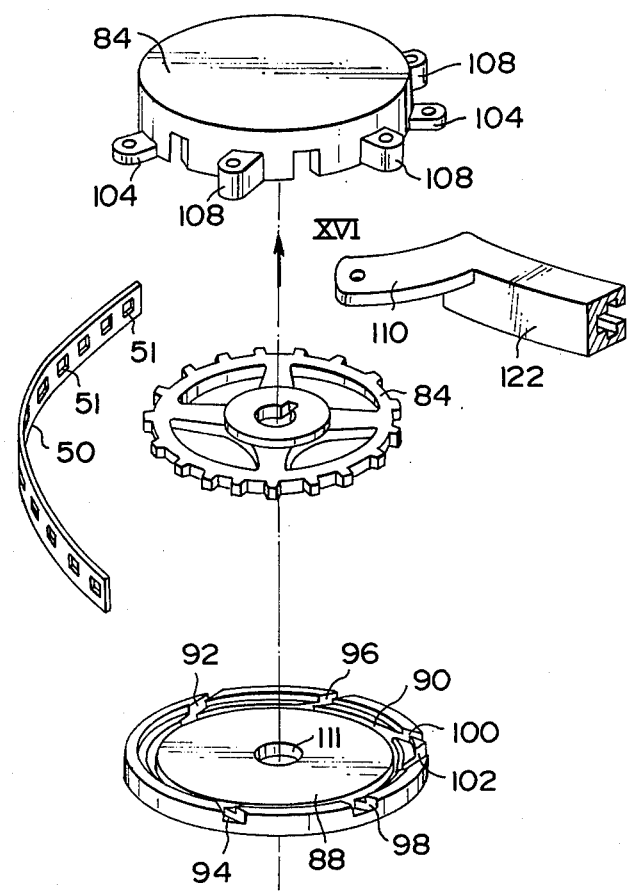
FIG. 14 is an exploded view of FIG. 13.
Figure 15:
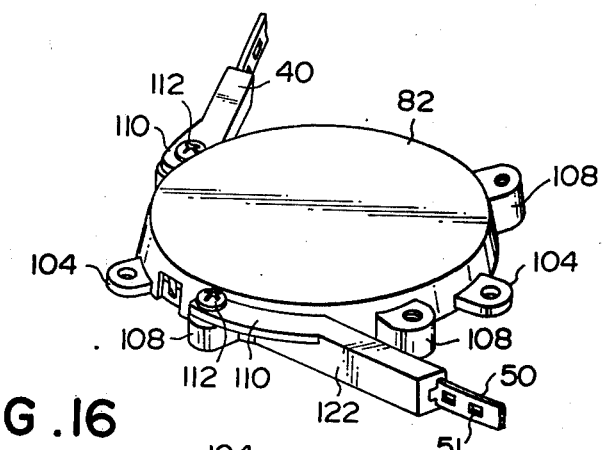
FIG. 15 is an assembled oblique view of FIG. 14.
Figure 16:
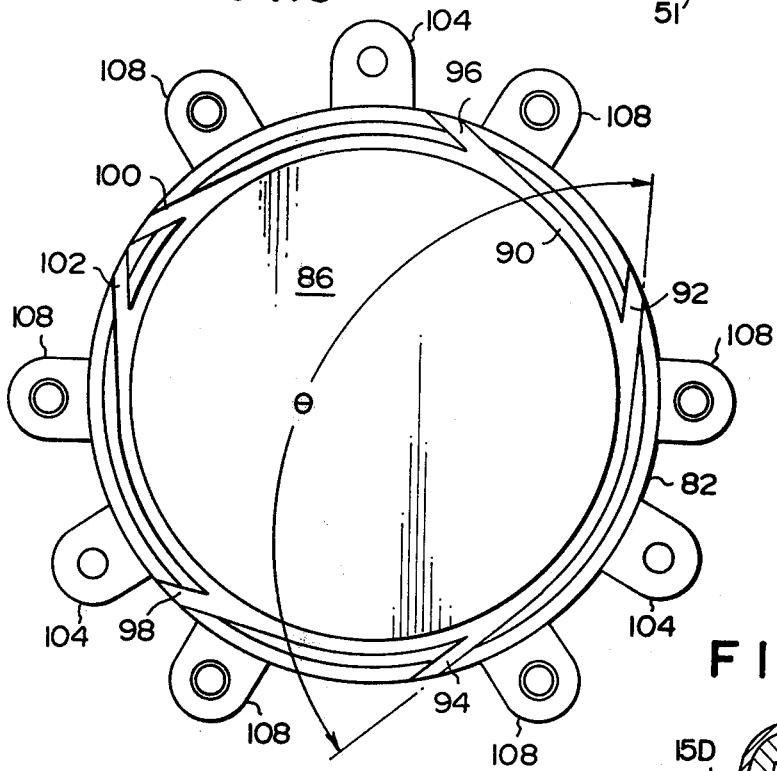
FIG. 16 is a view of the sprocket housing from the back of the housing.

In this case, extra passage channels 96, 98, 100 and 102 which are tangentially arc-shaped channel 90 in the housing recess 86 are formed in the sprocket housing 82 and cover 88. Accordingly, the angle of intersection (angle $\theta$ in FIG. 16) of the portion of the thick tape 50 bent in the sprocket housing 82 can be changed. Furthermore, three fastening flanges 104 project from equal distant points on the circumference of the sprocket housing 82. As is shown in FIG. 12, fastening screws 106 are used to fasten the sprocket housing 82 to the front pillar 79 of the vehicle via a bracket 107. Accordingly, the sprocket housing 82 can be installed on the front pillar 79 with the thick tape already wrapped around the sprocket wheel 84. As a result, the efficiency of the installation can be substantially increased. Furthermore, in regard to the position of the thick tape relative to the sprocket wheel 84 during the installation, it is necessary merely to wrap the thick tape 50 around the sprocket wheel 84 with the movable plate 26 in contact with the L-shaped stopper 76 (as shown in FIG. 6). Accordingly, positioning is extremely simple.

Furthermore, six support projections 108, which are similar in shape to the fastening flanges 104, but which are thicker, are formed on the circumference of the sprocket housing 82. A fastening part 110 which extends from one end of the slide rail 40 is screw-fastened to one of the support projections 108. Accordingly, when the entrance and exit positions of the thick tape 50 with respect to the sprocket housing 82 are altered, the appropriate support projection 108 corresponding to the appropriate passage channels 96 through 102 is selected for attachment of the slide rail 40.

Driving shaft 114 of the reversible motor 112, which is inserted into the interior of the sprocket housing 82 via a central hole 111 in the cover 88 is fastened to the sprocket wheel 84. The motor 112 is inserted into the interior of the front pillar 79 via a cut-out 116 formed in the front pillar 79. The lower end of the motor 112 is fastened to the inside of the front pillar 79 by means of bracket 118 and fastening screws 120. Furthermore, as is shown in FIG. 12, the upper end of the motor 112 is fastened to the front pillar 79 by means of fastening screw 106A which is passed through an arm 107A of the bracket 107 to which the sprocket housing 82 is fastened. The bracket 107 is fastened to the motor 112 beforehand and forms a part of the motor housing. Accordingly, the sproket housing 82 is fastened to the motor housing via the bracket 107.

In addition, the motor 112 is driven by being electrically connected with a source of electrical power for the vehicle. The motor is caused to operate by the opening and closing of the vehicle door and by the actuation of a seat switch which is embedded in the passenger seat so that it detects the seated passenger. In this case, the direction of the motor is as follows: When the passenger opens the door in order to enter or leave the vehicle, the motor runs so that the sprocket wheel 84 is caused to rotate in a counterclockwise direction; when the door is closed, the motor runs so that the sprocket wheel is caused to rotate in a clockwise direction. Furthermore, the number of revolutions completed by the sprocket wheel 84 is set so that the truck 18 will stop before the thick tape 50 contact the L-shaped rear stopper 78 as shown in FIG. 3.

A second slide rail 122 is fastened to the sprocket housing 82 in somewhat the same manner as slide rail 40 by means of a fastening screw 106. As is shown in FIG. 11, this second slide rail 122 extends from the lower end of the front pillar 79 into the interior of the rocker panel 124 of the vehicle via an opening 125. When the sprocket 84 is caused to rotate in a counterclockwise direction (with respect to FIG. 1), the thick tape 50 pushed out of the second slide rail 122 is pushed into the interior of the rocket panel 124.

Figure 17:
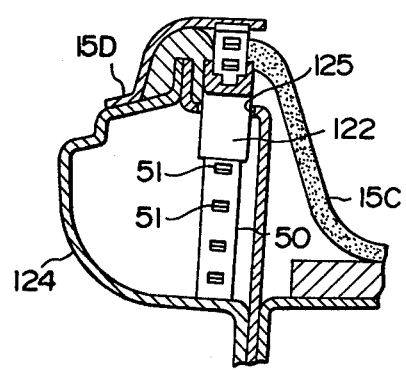
FIG. 17 is a cross section view along the line XVII—XVII of FIG. 1.

In practice, it should be apparent that the thick tape 50 should be at least long enough to reach from the sprocket housing 82 to the movable truck 18. In this way the driving force of the sprocket 84 can also be transmitted to the truck 18. In addition, it is desirable to make the guide rail 34 and the slide rail 40 from aluminum. In addition in the Figures for the purposes of illustration, front pillar garnish 15A is shown in FIG. 9, cowl side trim 15B is shown in FIG. 10 and carpet 15C and scuff plate 15D are indicated in FIG. 17.

For the purposes of description of operation, it is assumed that the vehicle is in motion and the passenger is wearing the belt 10 as is illustrated in FIG. 1 and the truck 18 has completed its maximum amount of movement toward the rear end of the guide rail 34 so that the belt 10 is fastened around the passenger.

In operation, if the vehicle is involved in an emergency such as collision, the inertial locking mechanism inside the retractor mechanism 66 abruptly stops the extension of the narrow belt 62. As a result, the outer end 16 of belt 10 is securely anchored to the roof side member 20 by the truck 18 and the passenger is restrained so that his safety is insured.

When the passenger opens the door in order to leave the vehicle, the motor 112 causes the sprocket wheel 84 to rotate in a counterclockwise direction. As a result, tension is applied to the thick tape 50 so that the tape 50 moves through the slide rail 40 in the direction indicated by arrow A. As a result, the truck 18 which is engaged with the tape 50 via the sliding block 54, is caused to move toward the front of the vehicle along the guide rail 34. Accordingly, the outer end 16 of the belt 10 is caused to move a considerable distance toward the front of the vehicle as is indicated by the two-dot chain line in FIG. 1. As a result, a sufficient space for the passenger to leave the vehicle is formed between the belt 10 and the passenger seat 22 and the passenger is easily able to leave the vehicle.

When the passenger closes the door after reentering the vehicle and seating himself in the passenger seat, the motor 112 is reversed so that a compressive force is applied to the thick tape 50 thereby causing the thick tape 50 to move in the direction opposite to that indicated by arrow A. Accordingly, sliding block 54 moves toward the retractor mechanism 66. As a result, the tuck 18 moves toward the retractor mechanism 66, i.e. toward the rear of the vehicle. When the truck 18 moves toward the rear of the vehicle, the belt 10 is automatically fastened around the passenger as shown in FIG. 1.

In addition to all the advantages described in connection with the first embodiment, the first embodiment possesses an additional advantage in that since the motor 112 is installed in the lower portion of the front pillar 79, the noise of the motor 112 generated when the thick tape is driven as described above is muffled such that it does not otherwise bother the passenger to any appreciable extent.

Figure 18:
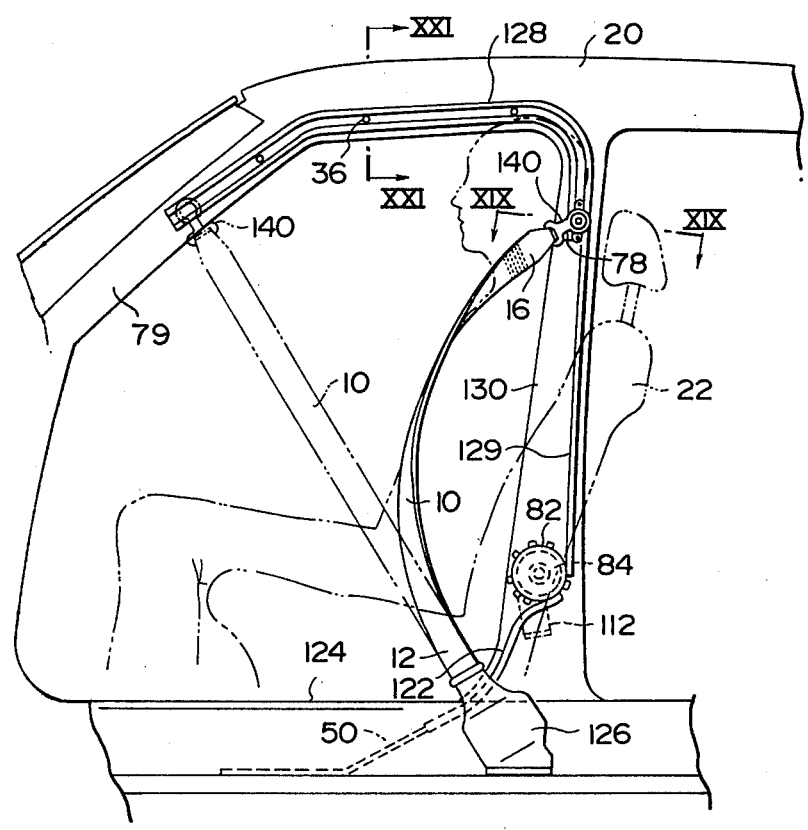
FIG. 18 is a side view which is analogy to FIG. 1 which illustrates a second embodiment of a passive seatbelt system in accordance with the teachings of the present invention.

Referring to FIG. 18 shown therein is the second embodiment of the passive seatbelt system in accordance with the teachings of the present invention. This embodiment is similar to the first embodiment except that no retractor mechanism is provided on the roof side member 20. This embodiment, the inner end 12 of the belt 10 is anchored to the vehicle floor 15 by a retractor mechanism 126. The retractor mechanism 126 is an emergency locking retractor of the same design as the retractor mechanism 66 in the first embodiment. Furthermore, in this embodiment, the guide rail 128 whose central portion runs in the direction of the length of the vehicle is fastened to the roof side member 20. In this case however, the forward portion of the guide rail 128 drops along the front pillar 74 while the rear portion of the guide rail 128 is bent at an appropriate angle from the central portion of the guide rail and extends toward the floor of the vehicle so that that portion of the guide rail in the vicinity of the rear end of the guide rail is roughly perpendicular to the central portion of the guide rail.

Figure 19:
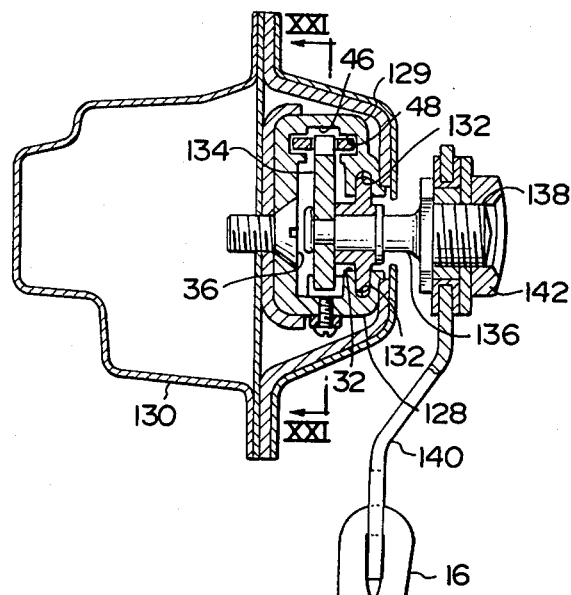
FIG. 19 is a cross section view along the line XIX—XIX in FIG. 18.
Figure 20:
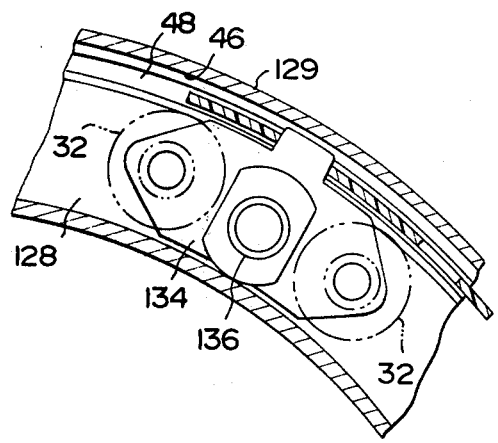
FIG. 20 is a cross section view illustrating how the movable plate runs through the bent portion of the guide rail.

Furthermore, as is shown in FIGS. 19, 21, the guide rail 128 is U-shaped in cross section. In addition, the slide rail 129 is integrally connected to the guide rail 128. Inside the slide rail 129 are rectangular groove 46 and slide grooves 48. Furthermore, a pair of recessed grooves 132 which face each other across the opening of the guide rail 128 are formed along the length of the opening in the guide rail 128. These recessed grooves 132 accommodate and guide a pair of wheels 32 which are mounted on the movable plate 134 as shown in FIG. 20.

An anchor bolt 136 projects horizontally from the central portion of the movable plate 134 toward the interior of the vehicle. An outer anchor plate 140 which anchors the outer end 16 of the belt 10 is mounted on a screw 138 formed on the tip of the anchor bolt 136. Furthermore, a nut 142 is screwed down over the screw 138 to prevent the anchor plate 140 from slipping. A spacer 144 is interposed between the nut 142 and the anchor 136 such that the outer anchor plate 140 can rotate about the anchor bolt 136.

As is shown in FIGS. 18 and 19, the guide rail 128 is fastened to the vehicle-interior sides of the roof side member 20, front pillar 79 and central pillar 130 by means of fastening screws 36. A garnish 136 is molded beforehand to the periphery of the guide rail 128. This garnish 146 connects the guide rail 128 with the roof lining 74 and the opening trim 148 which covers the lower end 20A of the roof side member 20. Accordingly, the guide rail 128 is covered by garnish 146 so that only the opening in the guide rail 128 can be seen from the interior of the vehicle. Furthermore, as in the first embodiment, an L-shaped stopper 76 is fastened to the front end of the guide rail 128 by means of the fastening screw 77 and an L-shaped rear stopper 78 is fastened to the rear end of the guide rail 128 by means of a fastening screw 77. As a result, the stroke of the movable plate 134 is limited. In addition, the slide rail 129 extends vertically downwardly beyond the end of the guide rail 128 which is dropped along the center pillar 130. This end of the slide rail 129 is fastened to a sprocket housing 82 which is fastened to the vehicle-interior side of the center pillar 130. As in the first embodiment, the thick tape 50 is caused to engage with the sprocket wheel 84 which is installed inside the sprocket housing 82. Furthermore, a second slide rail 122 of the same shape is that used in the first embodiment is provided from the sprocket housing 82 into the interior of the rocket panel 124. Accordingly, when the sprocket wheel 84 is caused to rotate in a clockwise direction, the tape 50 is caused to move downwardly by the sprocket wheel 84 and is pushed into the interior of the rocker panel 124.

As in the first embodiment, the sprocket wheel 84 housed in the sprocket housing 82 is driven by a reversible motor 112. The motor 112 is fastened to a center pillar 130. The stroke of the outer anchor plate 140 caused by the motor 112 runs from the position indicated by the solid lines in FIG. 18 to the position indicated by the two dot chain lines in FIG. 18, the latter being the position of the outer anchor plate when it has been moved to the front of the vehicle.

For the purposes of the description of the operation of the second embodiment, it is assumed that the passenger has automatically caused to don the belt 10 and therefore, the outer anchor plate 140 is located at the lower end of the portion of the guide rail 128 that is installed along the center pillar 130.

In operation, when the passenger changes his driving posture under normal vehicular operating condition, the belt 10 extends from the retractor mechanism 126 fastened to the vehicle floor 15. Accordingly, the passenger is easily able to change his driving posture. However, since the outer anchor plate 140 cannot move toward the front of the vehicle in the direction perpendicular to the guide rail 128, i.e. in a horizontal direction, there is no movement of the outer anchor plate 140. In addition, if the vehicle is involved in an emergency such as a collision, the extension of the belt 10 is abruptly stopped by the retractor mechanism 126 and there is no change in position of the outer anchor plate 140. Accordingly, the passenger is securely restrained by the belt 10.

When the passenger opens the door in order to leave the vehicle, the driving force of the motor 112 causes the sprocket wheel 84 to rotate in the counterclockwise direction so that the thick tape 50 causes the movable plate 134 to move toward the front of the vehicle. Accordingly, the outer anchor plate 140 moves along the center pillar 130, the roof side member 20 and the pillar 79 until it reaches the forward end of the guide rail 128 where it stops, as indicated by the two-dot chain line in FIG. 18. Thusly, a sufficient space for the passenger to leave the vehicle is formed between the belt 10 and the seat 22 and the passenger can easily exit.

Figure 23:
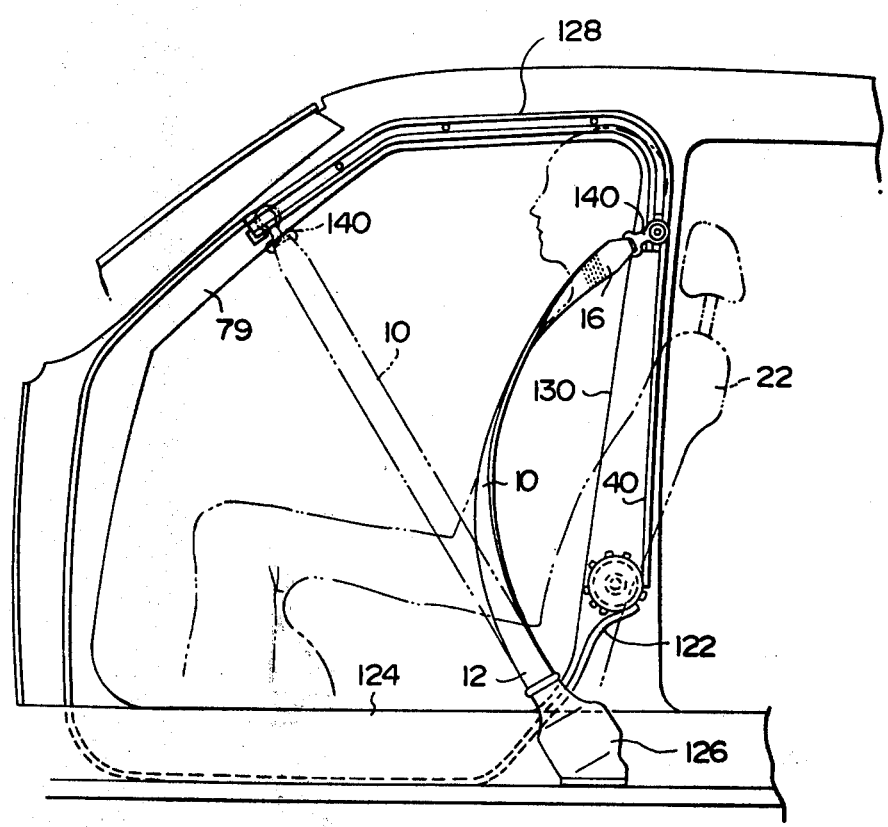
FIG. 23 is a side view analogy to FIG. 1 which illustrates a third embodiment of a passive seatbelt system in accordance with the teachings of the present invention.

Referring to FIG. 23, shown therein is a third embodiment of a passive seatbelt system in accordance with the teachings of the present invention. In this third embodiment, the second slide rail 122 described in the second embodiment is further extended so that the end of the slide rail 122 connects with the end of the slide rail 128 which is dropped along the front pillar 79, Furthermore, the thick tape 50 which is guided through the slide rail 128 and the second slide rail 122 is installed as a loop inside slide rail 128 and second slide rail 122. As a result, only a tensile force acts on the thick tape 50 when the tape 50 is driven and smooth driving of the thick tape 50 is possible. The remaining elements of the third embodiment are substantially the same as those described above and like elements are given like reference numerals and the description of their interconnection operation is omitted.

Referring to FIGS. 24 through 29 shown therein is a fourth embodiment of a passive seatbelt system in accordance with the teachings of the present invention. In this fourth embodiment, an outer side belt 150 is provided in addition to the belt 10. One end of this outer side belt 150 is engaged via a tongue plate 152 with a buckle mechanism 156 fastened to the upper rear portion of the vehicle door 154. This buckle mechanism 156 is a well-known buckle mechanism used in ordinary seatbelt system. If necessary the tongue plate 152 can easily be released by pressing a release button 158 on the buckle mechanism 156.

Meanwhile, the other end of the outer-side belt 150 is fastened to the lower rear portion of the door 154 by an anchor plate 160. An intermediate portion of the outer-side belt 150 is passed through a connecting ring 162 which is fastened to the tip of the belt 10. The connecting ring 162 is able to move freely along the length of the outer side belt 150. Furthermore, the base end of the belt 10 (i.e. the belt to which the connecting ring 162 is fastened) is retracted by a retractor mechanism 164 which is installed on the side of the passenger seat 22 on the opposite side of the seat from the vehicle door 54. An emergency locking retractor similar to the retractor mechanisms 126 and 66 previously described can also be used for retractor mechanism 164. Furthermore, it would also be possible to fasten the retractor directly to the floor 15 as in one of the embodiments described above.

Figure 25:
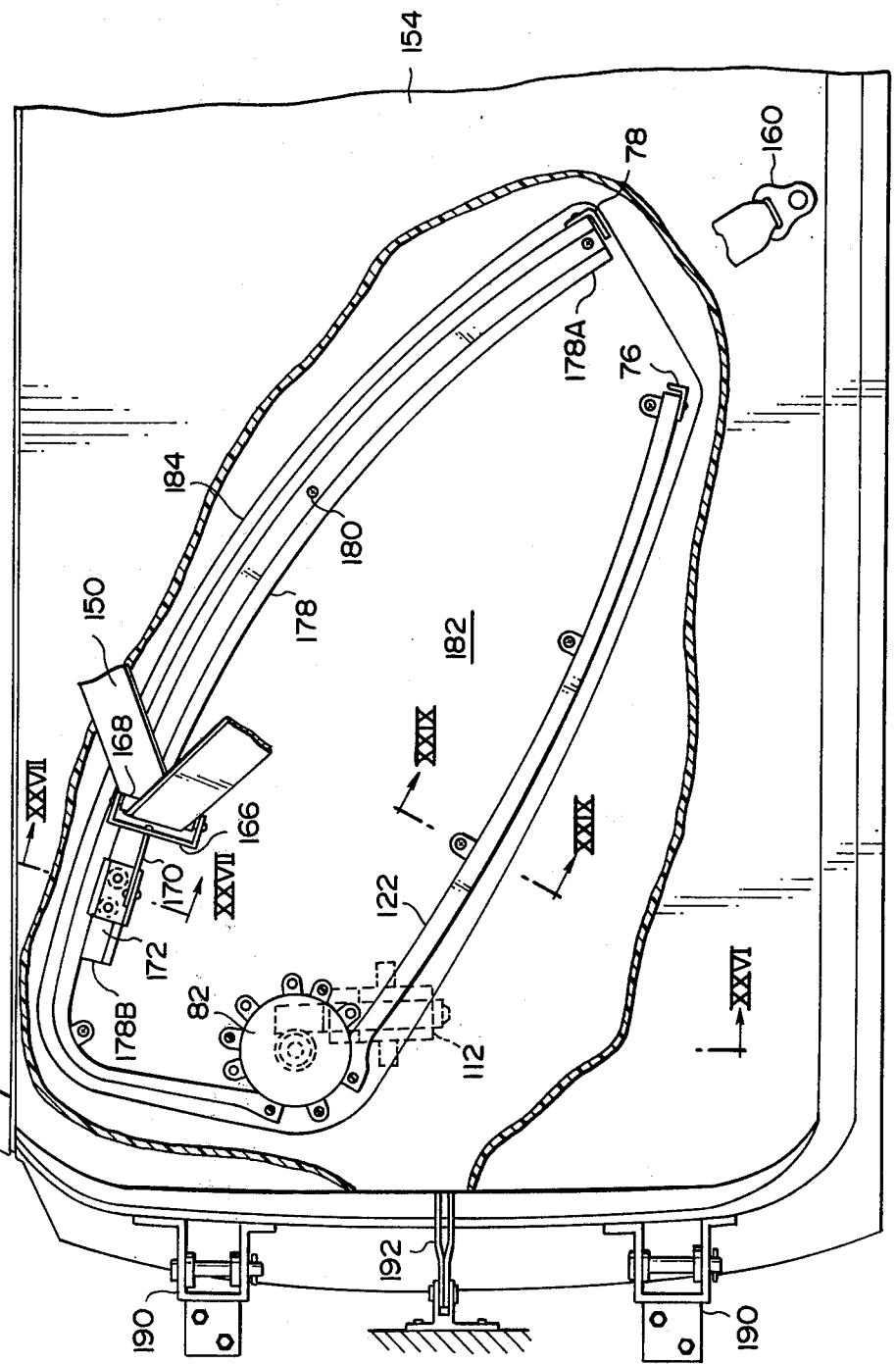
FIG. 25 is a partial cross section front view which illustrates the door in FIG. 24.
Figure 27:
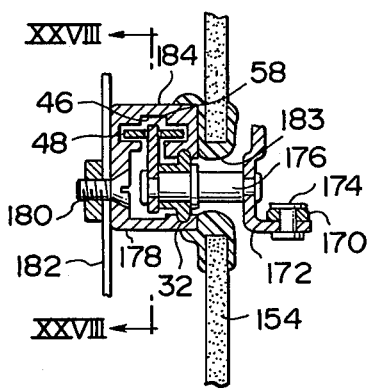
FIG. 27 is a cross section view along the line XXVII—XXVII in FIG. 25.

The portion of the belt 150 between the connecting ring 162 and the anchor plate 160 turns around a guide roller 168 which is rotatably mounted on a U-shaped frame 166. This U-shaped frame 166 is anchored to a movable plate 172 by a wire 170 such that the frame 166 moves together with the movable plate 172. As is shown in FIG. 27, the movable plate 172 is L-shaped in cross section. The wire 170 is anchored to one portion of the movable plate 172 by a pin 174. Anchor bolts 176 are fastened to another portion of the movable plate 172 and a pair of wheels are rotatably mounted on the movable plate 172. The movement of the wheels 32 are guided by a guide rail 178. As is shown in FIG. 27, the guide rail 178 is fastened to the door panel 182 by means of fastening screws 180. As is shown in FIG. 25, one end 178A of guide rail 178 is located above anchor plate 160 in the lower rear portion of the door 154 while the other end 178B of the guide rail 178 is located in the upper front portion of the door 154. The intermediate portion of the guide rail 178 takes the form of an appropriate circular arc which connects the end 178A with the end 178B. Accordingly, the movable plate 172 is able to move one end 178A of the guide rail 178 to the other end 178B of the guide rail 178. When the movable plate 172 moves toward the end 178B of the guide rail 178, the guide roller 168 causes the intermediate portion of the belt 150 to move toward the front of the vehicle. As a result, a sufficient space for the passenger to enter of leave the vehicle is formed between the belt 150 and 10 and the passenger seat 22. Conversely, when the movable plate 172 moves toward the end 178A of the guide rail 178, the tension on the belt 150 is reduced and the excess portion of the belt 10 is retracted by the retractor mechanism 164. As a result, the connecting ring 162 moves toward the retractor mechanism 164 and the two ends of the belt 150 turn through the connecting ring 162 contact respectively the shoulder and the lap of a passenger seated in the seat 22 such that the passenger is restrained by a three-point seatbelt system. Furthermore, a slot 183 is formed in the door trim 154 along the guide rail 178 so that the anchor bolts 176 can move.

Figure 28:
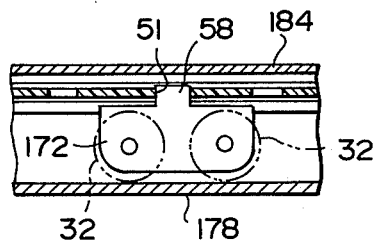
FIG. 28 is a cross section view along the line XXVIII—XXVIII in FIG. 27.
Figure 29:
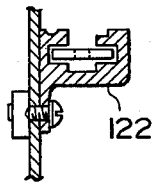
FIG. 29 is a cross section view along the line XXIX—XXIX in FIG. 25.

As is shown in FIG. 27, a slide rail 184 is formed as an integral part of the guide rail 178 installed within the door 155. As in the above described embodiment, the slide rail 184 has a rectangular groove 46 and slide grooves 48 so that the thick tape 50 can slide along the length of the slide rail 184. As is shown in FIG. 28, a projection 58 on the movable plate 172A is inserted in one of the openings 51 near the end of the thick tape 50 so that the movable plate 172A and therefore, the movable plate 172 are caused to move together with the thick tape 50.

One end of the slide rail 184 is extended beyond the end 178B of the guide rail 178. As is shown in FIG. 25, this end of the slide rail 184 is bent downwardly at the forward end of the door 155 and is fastened to a sprocket housing 82 which is fastened to the door panel 182. As a result, the thick tape 50 is caused to engage with the sprocket wheel 84 which is provided within the sprocket housing 82. As in the above-described embodiments, a second slide rail 122 is fastened to the sprocket housing 82. This second slide rail 122 is used to guide the thick tape 50 which is pushed out of the sprocket housing 82.

Figure 26:
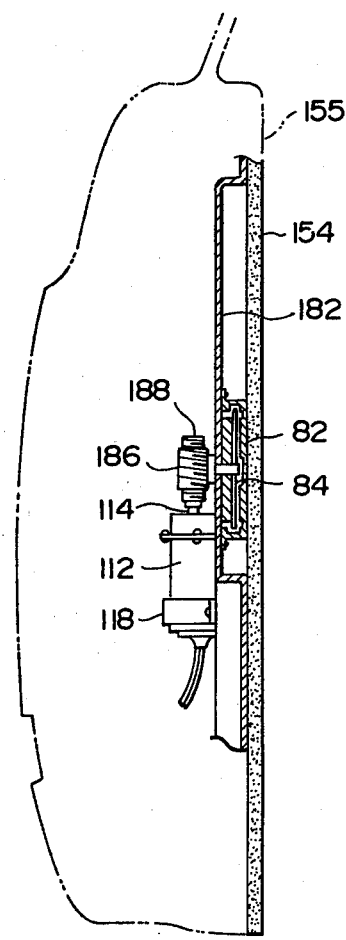
FIG. 26 is a cross section view along the line XXVI—XXVI in FIG. 25.

As is shown in FIG. 26, the driving shaft 114 of a reversible motor 112 fastened to the door panel 182 by means of a bracket 118 is connected to the sprocket 84 via a worm gear 186 and a worm wheel 188. The reversible motor 112 is electrically connected with an electrical power source of the vehicle. When the passenger opens the door 155 in order to enter the vehicle, the reversible motor 112 causes the sprocket wheel 84 to rotate in a counterclockwise direction. This cause the movable plate 172 to move toward the end of 178B of the guide rail 178. On the other hand, when the passenger closes the door after seating himself in the vehicle, the movable plate 172 is caused to move toward the end 178A of the guide rail 178. These movement storkes are set so that the movable plate 172 stops when it reaches the vicinity of the end 178A or the end 178B of the guide rail 178.

Furthermore, as is shown in FIG. 25, an L-shaped rear stopper 76 is fastened to the end of the slide rail 184 and an L-shaped stopper 76 is fastened to the end of the second slide rail 122. These stoppers 76 and 78 limit the maximum movement stroke of the thick tape 50. In addition, in FIGS. 24 and 25, the door is coupled to the vehicle by door hinges 192 and a door check 192 regulates the opening and closing force and angle of rotation of the door.

Figure 24:
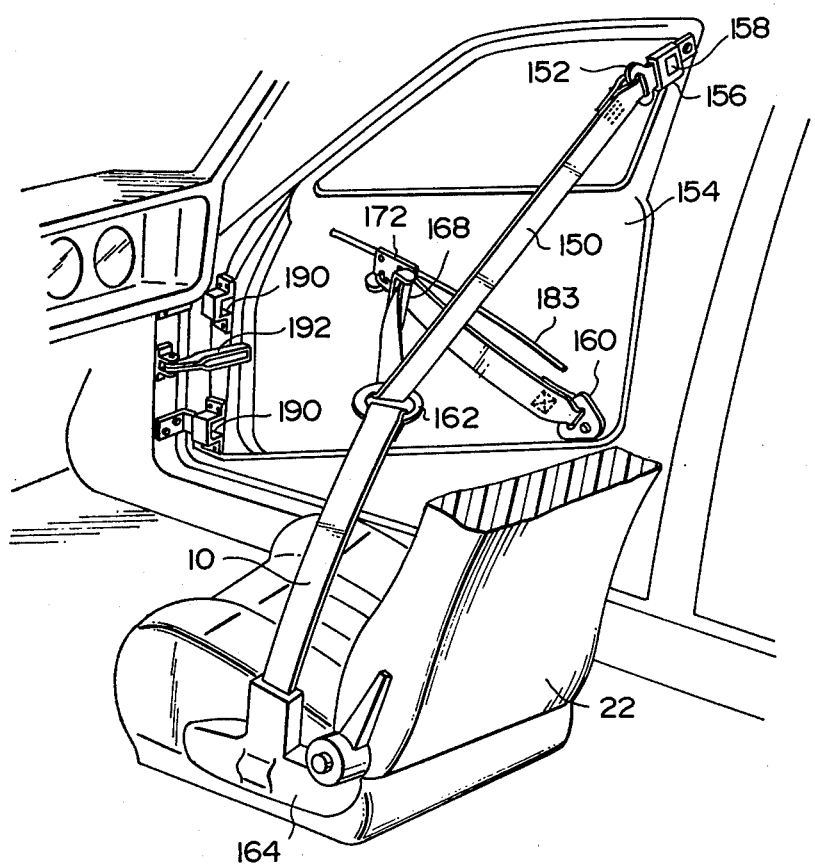
FIG. 24 is an oblique view of the interior of the vehicle which illustrates a fourth embodiment of a passive seatbelt system in accordance with the teachings of the present invention.

In operation, when the passenger opens the door 155 in order to enter the vehicle, the motor 112 via the sprocket wheel 84, cause the thick tape 50 to slide through the slide grooves 48 of the slide rail 184 so that the movable plate 172 is caused to move toward the end 178B of the guide rail 178, as shown in FIGS. 24 and 25. Thus, the guide roller 168 which is connected to the movable plate 172 by the wire 170, causes the outer-side belt 150 to be bent considerably toward the front of the vehicle, as shown in FIG. 24. As a result, the belt 10 is extended from the retractor mechanism 164 so that the belt 10 and the belt 150 move toward the front of the vehicle. As a result, the belt 10 and belt 150 are both substantially separated from the passenger seat 22 and a sufficient space is formed for the passenger to enter the vehicle.

When the passenger closes the door after seating himself in the vehicle, the motor 112 is reversed so that the movable plate 172 is caused to move toward the end 178A of the guide rail 178. As a result, the bend in the portion of the belt running between the anchor plate 160 and the connecting ring 162 is straightened out such that the tension on the outer-side belt 150 is reduced. Accordingly, the belt 10 is power retracted by the retractor mechanism 164 so that the connecting ring 162 moves toward the retractor mechanism 164. As a result, the outer-side belt 150 which is bent through the connecting ring 162 at an intermediate point contacts the shoulder and the lap of the passenger so that the passenger is placed under a three-point belt restraint.

If the vehicle is later involved in an emergency such as a collision, the inertial locking mechanism of the retractor mechanism 164 senses the existence of the vehicular emergency and stops the extension of the belt 10. As a result, the passenger is restrained by the belts 10 and 150. Accordingly, the passenger is prevented from being thrown toward the front of the vehicle and his safety is insured.

Should it be necessary for the passenger to escape to the outside of the vehicle following a collision, the passenger need merely press the release button 158 of the buckle mechanism 156. If this is done, the tongue plate 152 is released from the buckle mechanism 156 and the passenger is released from the seatbelt. Accordingly, the passenger can open the door 155 and can easily escape to the outside of the vehicle.

When the passenger opens the door 155 in order to leave the vehicle after the vehicle has stopped under normal operating conditions, the motor 112 is reversed and the guide roller 168 again moves toward the front of the vehicle so that the outer-side belt 150 is bent. Accordingly, a sufficient space for the passenger to leave the vehicle is formed between the belts 10 and 150 and the passenger seat 22 and the passenger can easily leave the vehicle.

Furthermore, it should be apparent that in this fourth embodiment, the driving force used to drive the sprocket wheel 84 is not necessarily limited to a motor 112, it would also be possible to utilize the opening and closing force of the door 155. In other words, it would also be possible to utilize the opening and closing force of the door 155 to fasten or unfasten the seatbelt. In particular, it would be possible to cause the movable plates 172 and 172A to move in response to the opening and closing of the door by interposing a speed-amplifying mechanism consisting of a gear train between the door check 192 and the sprocket wheel 84.

Figure 30:
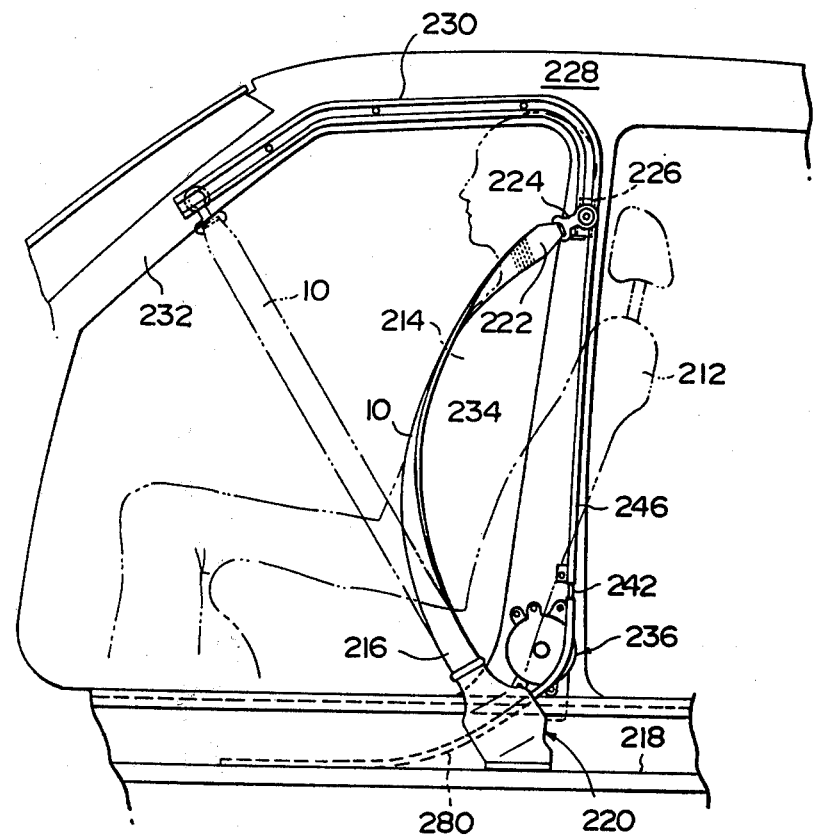
FIG. 30 is a side view analogy to FIG. 1 which illustrates a fifth embodiment of a passive seatbelt system in accordance with the teachings of the present invention.

Referring to FIG. 30, shown therein is a fifth embodiment of a passive seatbelt system in accordance with the teachings of the present invention. In FIG. 30 the belt 10 is fastened lying diagonally with respect to the passenger 214 seated in the seat 212.

The inner end 216 of the belt 10 is wound up by a winder 220 which is fastened to floor 218 of the vehicle. The belt 10 is wound up by the force of this winder 220 and in times of a vehicular emergency the unwinding of the belt 10 is instantly stopped by the operation of an inertial locking mechanism (not shown).

The other end 222 of the belt 10 is fastened to a runner piece 226 by an anchor plate 224. The runner piece 226 moves along a guide rail 230 which is fastened to the roof side 228 of the vehicle. The front end of the guide rail 230 is inclined along with front pillar 232 of the vehicle while the rear end descends along the center pillar 234.

In this manner, the anchor plate 224, which is fastened to the runner piece 226, may move from the rear end of the guide rail 230 (as shown in FIG. 1) to the front part of the guide rail 230 running along front pillar 232 (as shown by the double dash dotted interrupted lines of FIG. 30).

Figure 31:
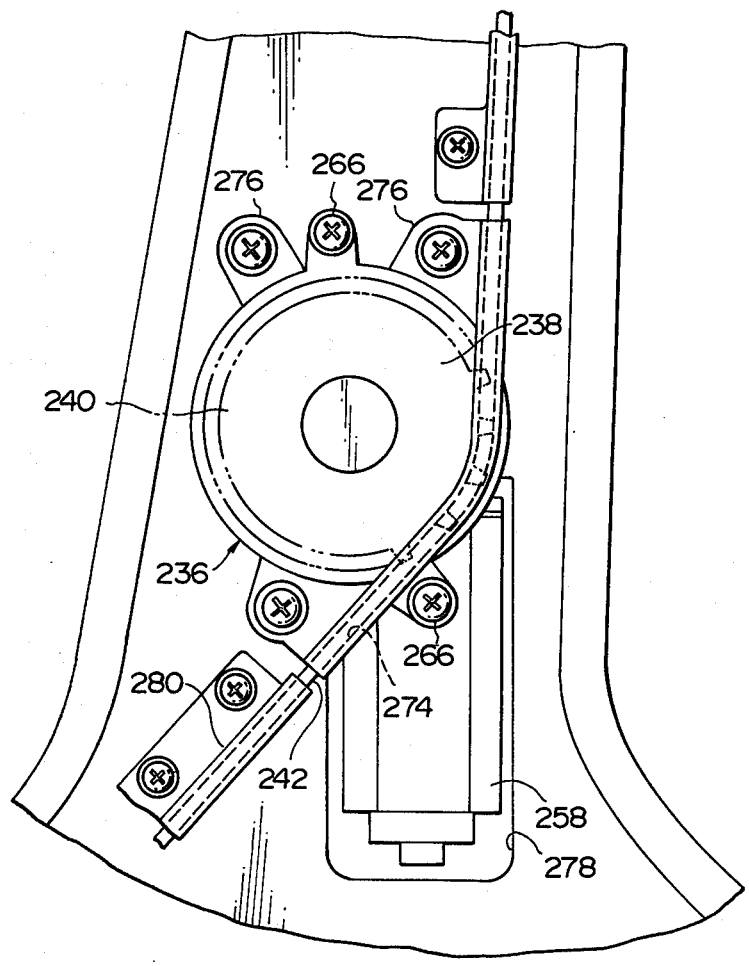
FIG. 31 is an enlarged view of a portion of FIG. 30.
Figure 32:
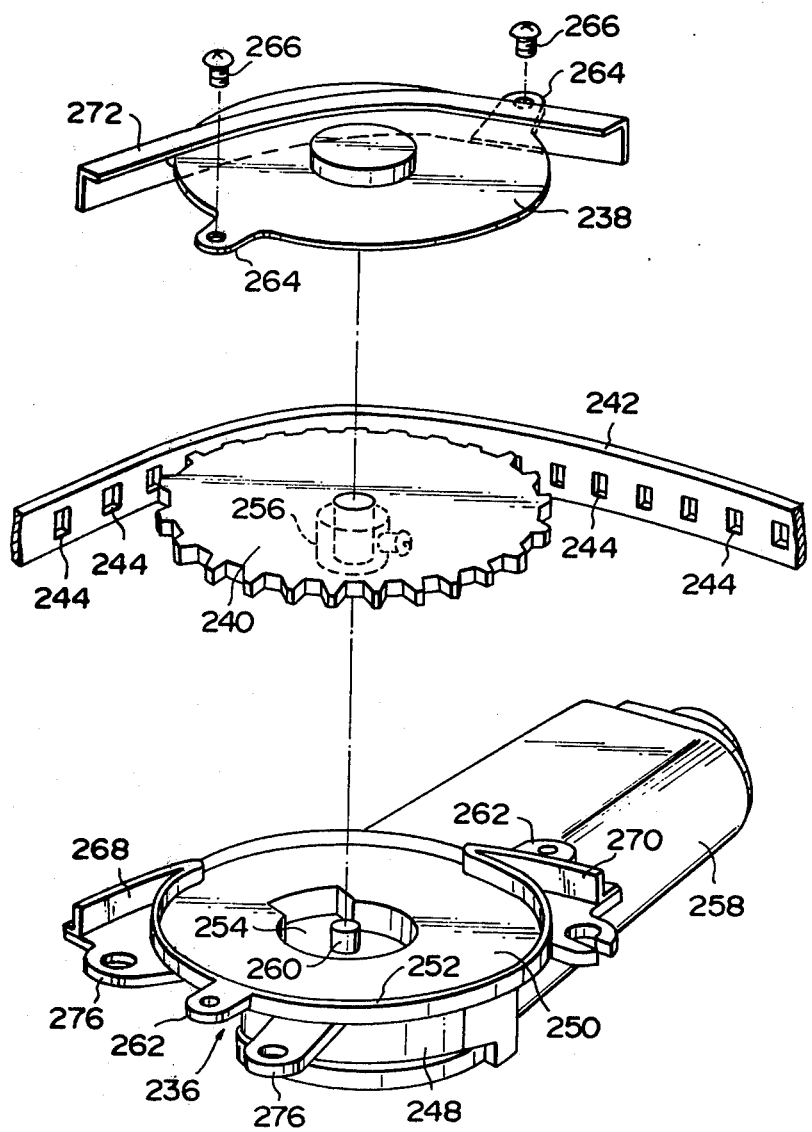
FIG. 32 is a disassembled enlarged view illustrating the assembly of the sprocket housing in the lid.

Also, sprocket housing 236 is fastened to the bottom of the center pillar 234 as shown in detail in FIG. 31. As shown in FIG. 32 the sprocket wheel 240 is provided in a space between the sprocket housing 236 and the lid 238. The sprocket wheel 240 engages with openings 244 and a flexible tape 242. One end of the flexible tape 242 passes through a tape track 246 which is mounted in the center of center pillar 234 and extends to guide rail 230. The flexible tape 242 is connected to anchor plate 224 by runner piece 226 within the guide rail 230. Furthermore, guide grooves are also formed within the guide rail 230 to guide the longitudinal direction of the flexible tape 242 and the anchor plate 224 is moved along the length of the guide rail 230 by the motion of the flexible tape 242 along the length of the guide rail 230.

Referring to FIG. 32, the sprocket housing 236 includes a thin sprocket case 250 which is fastened to a base plate 248. An edge 252 is raised around the circumference of the sprocket case 250 to protect the outer edge of the sprocket wheel 240 and the edge 252 extends three quarters of the way around circumference of the sprocket case 250. Also, a depression 254 is formed in the center of the sprocket case 250 to receive the boss 256 of the sprocket wheel 240. An output shaft 260 of a motor 258 which is fastened to the base plate 248 passes through the depression 254 and is coupled to the boss 256 of the sprocket wheel 240.

A disc-shaped lid 238 is provided on the edge 252 of the sprocket case 250 and the sprocket wheel 240 is held in the space between the sprocket housing 236 and lid 238 by screws 266 fastening together flanges 262 which protrude from the edge 252 and flanges 264 which protrude from the lid 238 together. However, a part of sprocket wheel 240 protrudes radially from that part of the sprocket case 250 which is not provided within the edge 252 and engages the tape 242.

As shown further in FIG. 32, L-shaped first tape guides 268 and 270 are fastened to the base plate 248 of the sprocket housing 236. One end of each of the tape guide 268 and 270 connects with the edge 252 of the sprocket case 250. A second tape guide 272 of L-shaped cross section is fastened to the lid 238. These first tape guides 268 and 270 and the second tape guide 272 together with the lid 238 which is fastened to the sprocket housing 236 form a tape guide path 274 of rectangular cross section. The tape guide path 274 receives that portion of the tape 242 which engages sprocket wheel 240 and that portion of the flexible tape 242 near the point of engagement. Further, as shown in FIG. 31, tape guides 268 and 270 are mounted tangential to sprocket wheel 240.

Flanges 276 protrudes from the base plate 248 of sprocket housing 236 and sprocket housing 236 is fastened to the inner side of the center pillar 234 by the flanges 236. Also, motor 258 which is fastened to the housing 236 is introduced into the center pillar 234 by a rectangular opening 278 formed in center pillar 234. The motor 258 is for the purpose of driving the sprocket wheel 240 to cause the tape 242 to move back and forth when a passenger enters or exits the vehicle. For example, after the passenger has entered and closed the door, the sprocket wheel 240 is caused to rotate in a clockwise direction in FIG. 31; when the door is opened in order to exit, the sprocket wheel 240 is turned in a counterclockwise direction.

The tape 242 engaging sprocket housing 236 and extending in a reverse direction to track tape 246 is moved into a tape track 280 which runs from the center pillar 234 towards the floor 218 of the vehicle.

For the purposes of describing the operation of the present embodiment, in FIG. 30 is shown the situation with the belt 10 fastened about a seated passenger and the passenger may easily change his driving position by unwinding the belt 10 from the winder 220. Furthermore, during a vehicular collision the unwinding of the belt 10 is instantly stopped by the inertial locking mechanism of the winder 220 and the runner piece 226 is prevented from running towards the front of the vehicle and the passenger 214 is securely restrained by the belt 10.

Also, in operation if the passenger opens the door to exit after a normal situation, the flexible tape 242 which engages the sprocket wheel 240 moves up along the tape track 246 in the center pillar 234 by means of the motor 258 turning the sprocket wheel 240 counterclockwise in FIG. 31. As a result, the anchor plate 224 and the runner piece 226 which is fastened to the flexible tape 242 is moved foward along the guide rail 230 until it reaches the position shown by the double dotted interrupted lines of FIG. 30 and an exit space formed between the belt 10 and the passenger. In this way, the belt 10 is automatically unfastened from the passenger and the passenger may exit the vehicle.

When the passenger reenters the vehicle and if the passenger closes the door after seating himself, the flexible tape 242 is moved in a reverse direction by motor 258 turning in the clockwise direction in FIG. 31 and the belt 10 again moves to be fastened around the passenger 214 as shown by the solid lines in FIG. 30.

In the embodiment described above, since the passive seatbelt system of this design has a guide path for flexible tape formed by an L-shaped first tape guides 268 and 270 and second tape guide 272, the sprocket housing 236 and lid 238 may be manufactured by injection molding or by a press. Also the sprocket wheel 240 and the flexible tape 242 are easily assembled by merely assembling the sprocket housing and the lid. As a result, the assembly of the sprocket housing together with the sprocket wheel 240 and the tape 242 is very easy, efficient and provides excellent results.

It should be apparent to those skilled in the art that the above described embodiments are merely illustrative but a few of the many possible specific embodiments which represent the application of the principles of the present invention. Numerous and varied other arrangements can be readily devised by those skilled in the art without departing from the spirit and scope of the invention.

We claim:

1. A passive seatbelt system of the type including a seatbelt, a flexible tape having a plurality of holes along its length and which is coupled to the seatbelt to cause the seatbelt to automatically fasten and unfasten from a passenger and a moving means for causing movement of the flexible tape, said moving means comprising:
   a sprocket housing having a substantially circular recess formed therein;
   a sprocket wheel provided in the circular recess of the sprocket housing and engaging with the holes in the tape;
   an arc-shaped channel which is formed in the sprocket housing and accomodates a portion of the flexible tape;
   a pair of tape passage channels which are formed in the sprocket housing tangential to the arc-shaped channel and which are oriented in different directions;
   a plurality of extra passage channels formed in the sprocket housing tangential to the arc-shaped channel; and
   a driving means for selectively rotating the sprocket a predetermined number of rotation in a clockwise and counterclockwise direction.

2. A passive seatbelt system as defined in claim 1 wherein the diameter of the arc-shaped channel is smaller than an outer diameter of the circular recess.

3. A passive seatbelt system as defined in claim 1 wherein the arc-shaped channel is annular.

4. A passive seatbelt system as defined in claim 1 wherein said arc-shaped channel and tape passage channels are deeper than the circular recess.

5. A passive seatbelt system as defined in claim 1 further comprising a plurality of support projections formed on a circumference of the sprocket housing.

6. A passive seatbelt system as defined in claim 1 further comprising a plurality of fastening flanges formed on the circumference of the sprocket housing and wherein said sprocket housing is fastened to a vehicle body via said fastening flanges.

7. A passive seatbelt system as defined in claim 6 wherein said sprocket housing is installed inside a vehicle door.

8. A passive seatbelt system as defined in claim 1 further comprising a circular cover fastened over the circular recess in the sprocket housing.

9. A passive seatbelt system as defined in claim 8 further comprising a motor and a drive shaft of said motor extending through said cover and coupled to said sprocket wheel whereby said sprocket wheel is driven by said motor.

10. A passive seatbelt system of the type including a seatbelt, a flexible tape having a plurality of holes along its length which is coupled to the seatbelt to cause the seatbelt to automatically fasten and unfasten from a passenger and a moving means for causing movement of the flexible tape, said moving means comprising:
    a sprocket housing;
    a lid fastened to the sprocket housing and defining a space between the sprocket housing and itself;
    a sprocket wheel provided in the space defined between the sprocket housing and the lid and engaging with the holes in the tape;
    one or more L-shaped first tape guides fastened to said sprocket housing and extending tangential to the sprocket housing, said guides being arranged in different directions from each other when a plurality of guides are used;

an L-shaped second tape guide fastened to said lid, and extending tangential to the lid in different directions said first and second tape guides being arranged in the same directions and configured so as to provide a guide path for said flexible tape and for holding said flexible tape in engagement with said sprocket wheel; and a driving means for selectively rotating the sprocket wheel a predetermined number of rotation in a clockwise and counter-clockwise direction.

11. A passive seatbelt system as defined in claim 10, wherein said first L-shaped guides form in cooperation with said second L-shaped guide and said lid a tape guide path being rectangular in cross section.

12. A passive seatbelt system as defined in claim 10, wherein said housing includes a portion for installing thereon the sprocket wheel and a portion for passing therethrough the tape.

13. A passive seatbelt system as defined in claim 12, wherein said portion for passing therethrough the tape is displaced from the portion for installing thereon the sprocket wheel.

* * * * *